(12) United States Patent
Soroushian et al.

(10) Patent No.: US 8,832,297 B2
(45) Date of Patent: Sep. 9, 2014

(54) SYSTEMS AND METHODS FOR PERFORMING MULTIPHASE ADAPTIVE BITRATE STREAMING

(75) Inventors: Kourosh Soroushian, San Diego, CA (US); Auke van der Schaar, Los Angeles, CA (US); Jason Braness, San Diego, CA (US); William David Amidei, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 0 days.

(21) Appl. No.: 13/339,992

(22) Filed: Dec. 29, 2011

(65) Prior Publication Data

US 2013/0007297 A1   Jan. 3, 2013

Related U.S. Application Data

(60) Provisional application No. 61/502,769, filed on Jun. 29, 2011.

(51) Int. Cl.
| | | |
|---|---|---|
| *G06F 15/16* | (2006.01) | |
| *H04L 29/06* | (2006.01) | |
| *H04N 21/442* | (2011.01) | |
| *H04N 21/6587* | (2011.01) | |
| *H04N 21/845* | (2011.01) | |

(52) U.S. Cl.
CPC ............ *H04L 65/4084* (2013.01); *H04L 65/80* (2013.01); *H04L 65/4092* (2013.01); *H04N 21/44209* (2013.01); *H04N 21/6587* (2013.01); *H04N 21/8456* (2013.01); *H04L 65/602* (2013.01)
USPC ........................................................ 709/231

(58) Field of Classification Search
USPC ........................................................ 709/231
See application file for complete search history.

(56) References Cited

U.S. PATENT DOCUMENTS

| | | | |
|---|---|---|---|
| 6,385,673 B1 | 5/2002 | Demoney | |
| 2010/0235542 A1* | 9/2010 | Visharam et al. | 709/246 |
| 2010/0306810 A1* | 12/2010 | Brooks et al. | 725/109 |
| 2011/0066673 A1* | 3/2011 | Outlaw | 709/203 |

FOREIGN PATENT DOCUMENTS

WO   2013002834 A1   1/2013

OTHER PUBLICATIONS

International Search Report and Written Opinion for Application PCT/US2011/68156, Report Completed Apr. 7, 2012, 11 pgs.

* cited by examiner

*Primary Examiner* — Jason Gee
(74) *Attorney, Agent, or Firm* — KPPB LLP

(57) ABSTRACT

Multiphase adaptive bitrate streaming systems and methods in accordance with embodiments of the invention are disclosed. One embodiment of the invention includes a processor configured to request portions of files. In addition, the processor streams encoded media in a first operational phase utilizing a first set of stream switching conditions. When at least one phase transition criterion is satisfied, the client application configures the processor to transition to a second operational phase utilizing a second set of stream switching conditions.

41 Claims, 6 Drawing Sheets

SYSTEMS AND METHODS FOR PERFORMING MULTIPHASE ADAPTIVE BITRATE STREAMING

CROSS REFERENCE TO RELATED APPLICATIONS

This application claims priority to U.S. Provisional Application Ser. No. 61/502,769, entitled "Muliphase Adaptive Streaming Algorithm" to Soroushian et al., filed Jun. 29, 2011, the entirety of which is incorporated herein by reference.

FIELD OF THE INVENTION

The present invention generally relates to streaming media and more specifically to stream switching in adaptive bitrate streaming systems.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

A common goal of adaptive bitrate streaming is to stream the highest bitrate stream available given the streaming conditions experienced by the playback device without stalls in the playback of media due to underflow. Underflow occurs when the playback device receives streaming media at a lower data rate than the minimum data rate for playing back the stream at the display rate of the playback device. The video used in most adaptive bitrate streaming systems is encoded using variable bit rate encoding, which is typically most efficient. Even though the bitrate of the stream varies in time, the stream is typically described based upon its average bitrate. When variable bitrate encoding is used, the maximum bitrate of the stream is the rate that ensures that no underflow will occur given a certain buffer size. Most playback devices accommodate variation in the size of the encoded frames using a buffer. In the context of video, the buffering delay (which can also be referred to as the seek delay) is the time a playback device waits between starting filling the buffer and commencing playback to prevent underflow (i.e., a certain amount of data is buffered before decoding can start).

Adaptive streaming solutions typically utilize Hypertext Transfer Protocol (HTTP), published by the Internet Engineering Task Force and the World Wide Web Consortium as RFC 2616, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

SUMMARY OF THE INVENTION

Multiphase adaptive bitrate streaming systems in accordance with embodiments of the invention can transition between different phases in which different stream switching conditions are utilized. One embodiment of the invention includes a processor configured, via a client application, to request portions of files from a remote server. In addition, the client application further configures the processor to commence streaming of the encoded media in a first operational phase utilizing a first set of stream switching conditions by requesting portions of the encoded media from one of the plurality of alternative streams, and measure streaming conditions. When a first set of stream switching conditions is satisfied in the first operational phase, the client application configures the processor to request portions of the encoded media from another of the plurality of alternative streams and when at least one phase transition criterion is satisfied, the client application configures the processor to transition to a second operational phase utilizing a second set of stream switching conditions. Furthermore, when the second set of stream switching conditions is satisfied in the second operational phase, the client application configures the processor to request portions of the encoded media from another of the plurality of alternative streams.

In a further embodiment, the first set of stream switching conditions configure the playback device to respond more rapidly to changes in streaming conditions than when the playback device is configured using the second set of stream switching conditions.

In another embodiment, the second set of stream switching conditions configure the playback device to buffer more content than when the playback device is configured using the first set of stream switching conditions.

In a still further embodiment, the client application configures the processor device to progress through a plurality of operational phases including the first and second operational phases, where a different set of stream switching conditions are utilized during each operational phase.

In still another embodiment, in at least one of the operational phases the client application configures the playback device to transition to an operational phase having a larger maximum buffer size when at least one phase transition criterion is satisfied.

In a yet further embodiment, in at least one of the operational phases the client application configures the playback device to transition to an operational phase storing a larger amount of content measured in units of time when at least one phase transition criterion is satisfied.

In yet another embodiment, in at least one of the operational phases the client application configures the playback device to transition to an operational phase having a smaller maximum buffer size when at least one phase transition criterion is satisfied.

In a further embodiment again, in at least one of the operational phases the client application configures the playback device to transition to an operational phase storing a smaller amount of content measured in units of time when at least one phase transition criterion is satisfied.

In another embodiment again, the client application configures the playback device to transition to the second operational phase in response to stable streaming conditions for a predetermined period of time.

In a further additional embodiment, the client application determines stable streaming conditions by observing a set of consecutive measurements and determining that the minimum and maximum observed rates fall within a predetermined range.

In another additional embodiment, the client application determines stable streaming conditions by observing the same streaming level for a predetermined amount of time.

In a still yet further embodiment, the client application configures the playback device to transition to the second operational phase in response to the time in which the playback device is in the first operational phase exceeding a predetermined maximum time.

In still yet another embodiment, the client application configures the playback device to select streams appropriate to the second operational phase when the playback device transitions to the second operational phase in response to the time in which the playback device is in the first operational phase exceeding a predetermined maximum time.

In a still further embodiment again, the client application further configures the processor so that when at least one phase transition criteria is satisfied, the playback device transitions from the second operational phase to the first operational phase in which the first set of stream switching conditions are utilized.

In still another embodiment again, the client application configures the playback device to transition from the second operational phase to the first operational phase in response to the second set of stream switching conditions being satisfied such that a stream switch occurs involving the playback device requesting portions of encoded media from a stream having a maximum bitrate that is lower than the maximum bitrate of the stream from which the playback device was requesting portions of the encoded media prior to the stream switch.

In a still further additional embodiment, the client application configures the processor to suspend requesting portions of encoded media from the stream following the stream switch until the amount of buffered media is less than a maximum buffer size that forms part of the first set of stream switching conditions.

In still another additional embodiment, the client application configures the processor to suspend requesting portions of encoded media from the stream following the stream switch until the amount of buffered media measured in units of time is less than a maximum amount of time that forms part of the first set of stream switching conditions.

One embodiment of the method of the invention includes: commencing streaming of the encoded media in a first operational phase utilizing a first set of stream switching conditions by requesting portions of the encoded media from one of the plurality of alternative streams using a playback device; measuring streaming conditions using the playback device; when the first set of stream switching conditions is satisfied in the first operational phase, requesting portions of the encoded media from another of the plurality of alternative streams using the playback device; when at least one phase transition criterion is satisfied, transitioning the playback device to a second operational phase utilizing a second set of stream switching conditions; and when the second set of stream switching conditions is satisfied in the second operational phase, requesting portions of the encoded media from another of the plurality of alternative streams using the playback device.

In a further embodiment of the method of the invention, the first set of stream switching conditions configure the playback device to respond more rapidly to changes in streaming conditions than when the playback device is configured using the second set of stream switching conditions.

In another embodiment of the method of the invention, the second set of stream switching conditions configure the playback device to buffer more content than when the playback device is configured using the first set of stream switching conditions.

A still further embodiment of the method of the invention, also includes progressing the playback device through a plurality of operational phases including the first and second operational phases, where a different set of stream switching conditions are utilized during each operational phase.

Still another embodiment of the method of the invention also includes transitioning the playback device to an operational phase having a larger maximum buffer size when at least one phase transition criterion is met.

A yet further embodiment of the method of the invention also includes transitioning the playback device to an operational phase storing a larger amount of content measured in units of time when at least one phase transition criteria is satisfied.

Yet another embodiment of the method of the invention also includes transitioning the playback device to an operational phase having a smaller maximum buffer size when at least one phase transition criterion is met.

A further embodiment again of the method of the invention also includes transitioning the playback device to an operational phase storing a smaller amount of content measured in units of time when at least one phase transition criterion is satisfied.

In another embodiment again of the method of the invention, the playback device transitions to the second operational phase in response to stable streaming conditions for a predetermined period of time.

In a further additional embodiment of the method of the invention, the playback device transitions to a subsequent operational phase in response to stable streaming conditions for a predetermined period of time.

In another additional embodiment of the method of the invention, the playback device determines stable streaming conditions by observing a set of consecutive measurements and determining that the minimum and maximum observed rates fall within a predetermined range.

In a still yet further embodiment of the method of the invention, the playback device determines stable streaming conditions by observing the same streaming level for a predetermined amount of time.

In still yet another embodiment of the method of the invention, the playback device transitions to the second operational phase in response to the time in which the playback device is in the first operational phase exceeding a predetermined maximum time.

A still further embodiment again of the method of the invention also includes selecting streams appropriate to the second operational phase using the playback device when the playback device transitions to the second operational phase in response to the time in which the playback device is in the first operational phase exceeding a predetermined maximum time.

Still another embodiment again of the method of the invention also includes when at least one phase transition criterion is satisfied, transitioning the playback device to the first operational phase in which the first set of stream switching conditions are utilized.

A still further additional embodiment of the method of the invention also includes transition the playback device from the second operational phase to the first operational phase in response to the second set of stream switching conditions being satisfied such that a stream switch occurs involving the playback device requesting portions of encoded media from a stream having a maximum bitrate that is lower than the maximum bitrate of the stream from which the playback device was requesting portions of the encoded media prior to the stream switch.

Still another additional embodiment of the method of the invention also includes suspending requests from the playback device for portions of encoded media from the stream following the stream switch until the amount of buffered media is less than a maximum buffer size that forms part of the first set of stream switching conditions.

A yet further embodiment again of the method of the invention also includes suspending requests from the playback device for portions of encoded media from the stream following the stream switch until the amount of buffered media measured in units of time is less than a maximum amount of time that forms part of the first set of stream switching conditions.

Yet another embodiment again of the method of the invention also includes when at least one phase transition criterion is satisfied, transitioning the playback device to the previous operational phase in which the corresponding enumeration of the set of stream switching conditions are utilized.

A yet further additional embodiment of the method of the invention also includes transition the playback device from an operational phase greater than the first to the previous operational phase in response to the corresponding enumeration of the set of stream switching conditions being satisfied such that a stream switch occurs involving the playback device requesting portions of encoded media from a stream having a maximum bitrate that is lower than the maximum bitrate of the stream from which the playback device was requesting portions of the encoded media prior to the stream switch.

Yet another additional embodiment of the method of the invention also includes suspending requests from the playback device for portions of encoded media from the stream following the stream switch until the amount of buffered media is less than a maximum buffer size that forms part of the previous set of stream switching conditions.

A further additional embodiment again of the method of the invention also includes suspending requests from the playback device for portions of encoded media from the stream following the stream switch until the amount of buffered media measured in units of time is less than a maximum amount of time that forms part of the previous set of stream switching conditions.

Another further embodiment of the invention includes: commencing streaming of the encoded media in a first operational phase utilizing a first set of stream switching conditions by requesting portions of the encoded media from one of the plurality of alternative streams; measuring streaming conditions; when the first set of stream switching conditions is satisfied in the first operational phase, requesting portions of the encoded media from another of the plurality of alternative streams; when at least one phase transition criterion is satisfied, transitioning to a second operational phase utilizing a second set of stream switching conditions; and when the second set of stream switching conditions is satisfied in the second operational phase, requesting portions of the encoded media from another of the plurality of alternative streams.

DETAILED DISCLOSURE OF THE INVENTION

Turning now to the drawings, multiphase adaptive bitrate streaming systems and methods in accordance with embodiments of the invention are illustrated. Adaptive bitrate streaming systems typically provide a number of alternative streams of video encoded at different maximum bitrates. As streaming conditions change, a playback device can switch between streams to prevent disruption in the playback of the content. Typically, adaptive bitrate streaming systems define a set of conditions that determine whether the playback device continues requesting content for playback, or whether the playback device switches to lower or higher bitrate stream(s). These conditions can be referred to as stream switching conditions. The stream switching conditions used by the playback device can cause the playback device to react very quickly to changes in the streaming conditions and buffer less content. Alternatively, the stream switching conditions applied by the playback device may cause the playback device to buffer more content and react more slowly to streaming condition changes to ride out temporary bandwidth fluctuations.

In many embodiments of the invention, playback devices are configured to progress through multiple operational phases in which different stream switching conditions are applied by the playback device. These operational phases may be discrete phases or can be a continuum in which the stream switching continuously change. A system where the playback devices progresses through multiple operational phases in which different stream switching conditions are applied by the playback device can be referred to as a multiphase adaptive bitrate streaming system. In such a system, the same stream switching conditions or heuristics are not applied throughout the duration of the streaming of a particular piece of content. Instead, the stream switching conditions can change over time based upon a variety of factors including (but not limited to) duration of playback of the content, time since last stream switch, duration within an operation phase, buffered content and/or the stability of the streaming conditions experienced during playback. While the decision to switch between streams is typically dependent upon a change in streaming conditions, the decision to switch between phases (i.e. the set of stream switching conditions to apply) can be a function of stability in streaming conditions. Multiphase adaptive bitrate streaming systems and methods for performing multiphase adaptive bitrate streaming of multimedia content in accordance with embodiments of the invention are discussed further below.

Multiphase Streaming System Architecture

Figure 1:
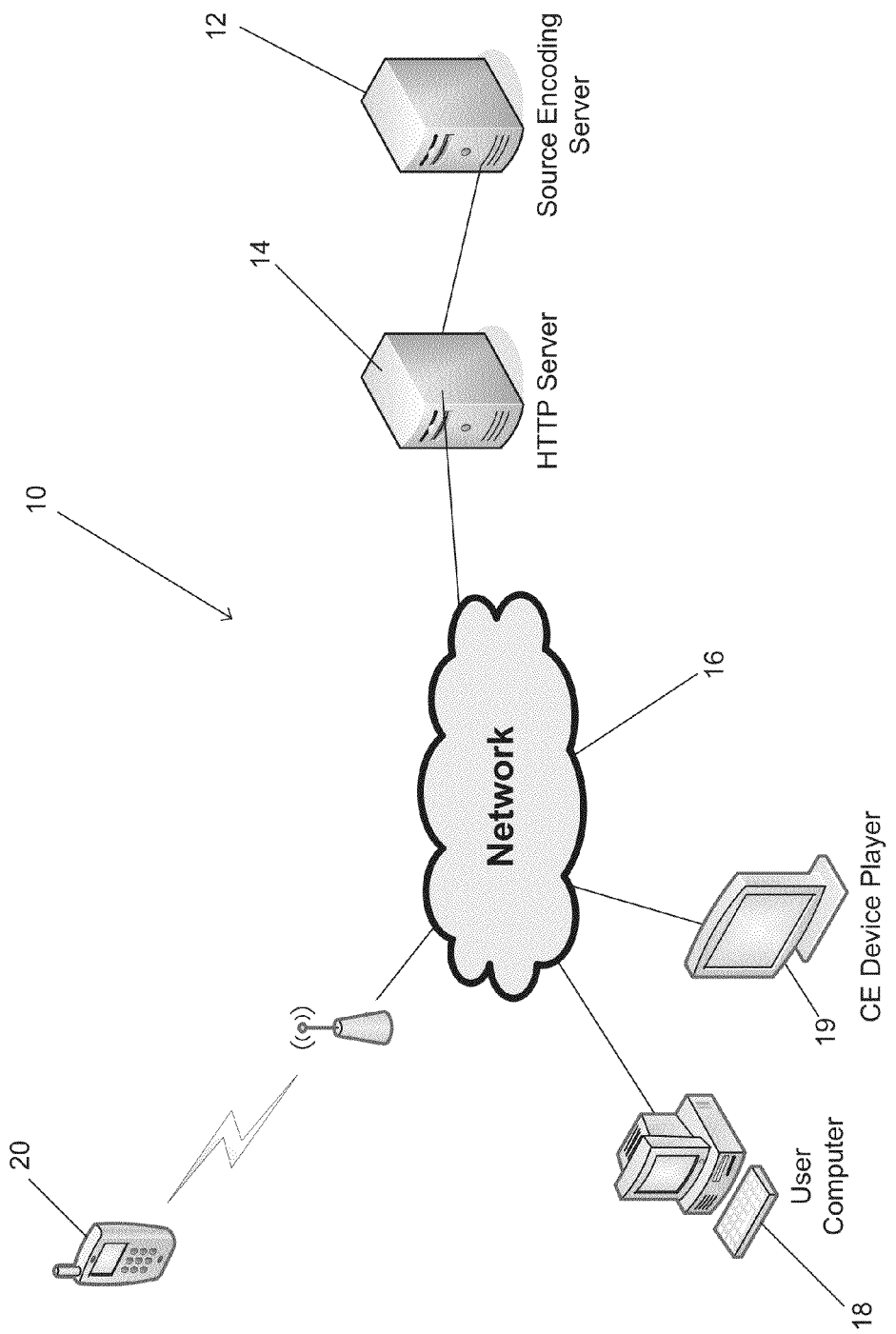
FIG. 1 is a network diagram of a media streaming system in accordance with an embodiment of the invention.

A multiphase adaptive bitrate streaming system in accordance with an embodiment of the invention is illustrated in FIG. 1. The multiphase adaptive bitrate streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). The source encoding server 12 typically generates a top level index to a plurality of container files containing the streams, at least a plurality of which are alternative streams. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. The top level index file and the container files are uploaded to an HTTP server 14. In other embodiments, the server is not an HTTP server but is a server configured to implement any stateless or stateful protocol including but not limited to an RTSP server. Although the source encoding server 12 is described above as generating the top level index file, in many embodiments the top level index file is dynamically generated in response to a request for a specific piece of content by a playback device. Systems and methods for encoding source media for adaptive bitrate streaming are disclosed in U.S. patent application Ser. No. 13/221,682 entitled "Systems and Methods for Adaptive Bitrate Streaming of Media Stored in Matroska Container Files Using Hypertext Transfer Protocol" to Braness et al., filed Aug. 30, 2011, the disclosure of which is incorporated herein by reference in its entirety.

In the illustrated embodiment, a variety of playback devices use HTTP or another appropriate stateless protocol to request portions of a top level index file and the container files via a network 16 such as the Internet. Prior to a playback device performing adaptive bitrate streaming using portions of media from alternative streams contained within the container files, a bandwidth probe can be performed by the playback device to determine available bandwidth. Once the bandwidth probe has been completed, the playback device can utilize data within the top level index including (but not limited to) the maximum bitrate of each of the available streams to determine the initial streams from which to commence requesting portions of encoded media as part of an adaptive bitrate streaming process.

Once playback of content from the initial set of streams commences, the playback device utilizes the top level index to perform adaptive bitrate streaming of the content in response to changes in streaming conditions. In a multiphase adaptive bitrate streaming system, the playback device can progress through a series of operational phases in which the playback device responds differently in each phase to changes in the streaming conditions. In a number of embodiments, stability in streaming conditions or improving streaming conditions can result in a transition to a phase in which the playback device assumes stable operating conditions, buffers more content, and is less responsive to fluctuations in streaming conditions. In many embodiments, a deterioration in streaming conditions that results in a stream switch to a set of streams requiring less bandwidth results in the playback device transitioning to a phase in which the playback device assumes unstable operating conditions, buffers less content, and responds rapidly to variations in streaming conditions.

Figure 2:
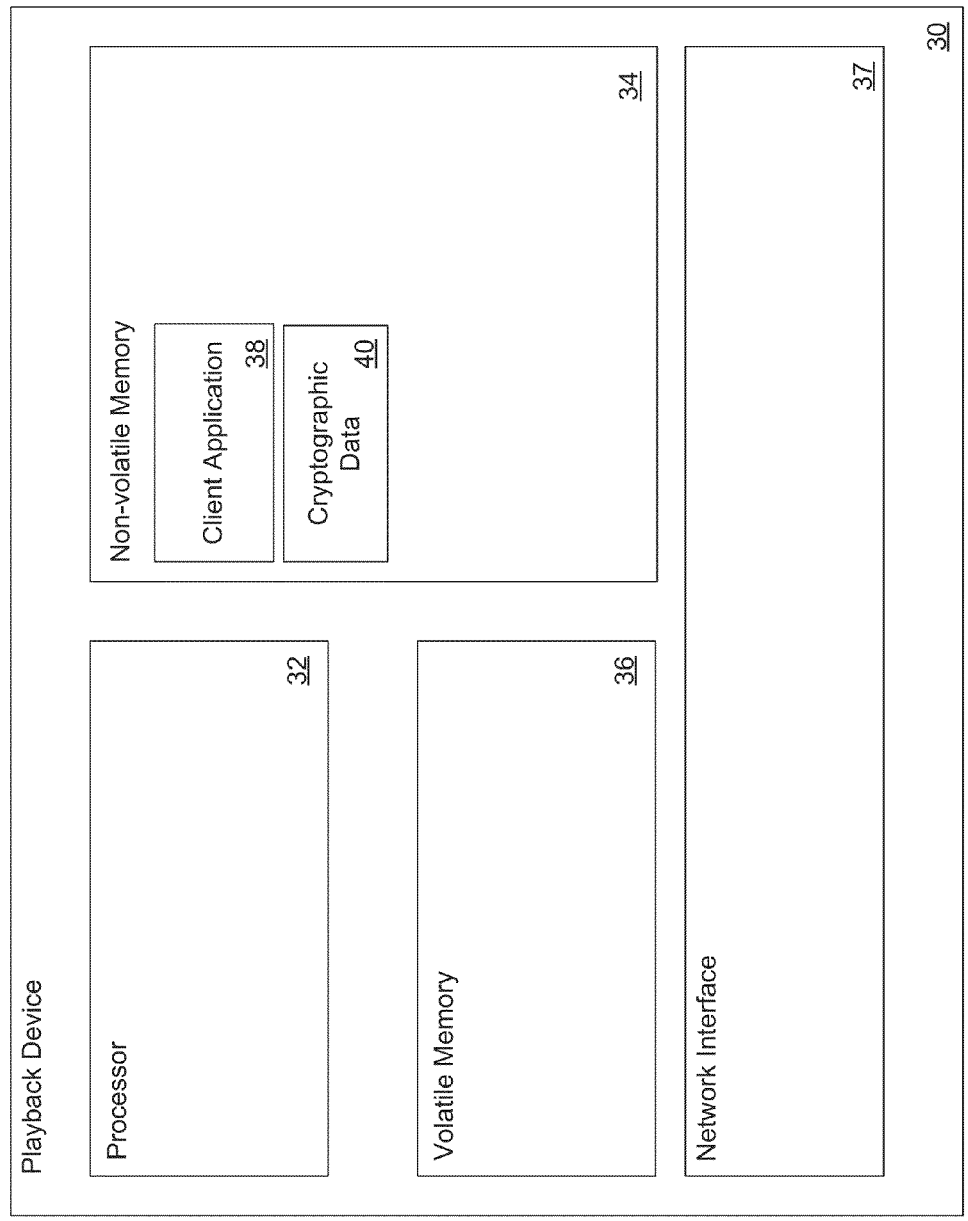
FIG. 2 conceptually illustrates a playback device configured to perform multiphase adaptive bitrate streaming in accordance with an embodiment of the invention.

In the illustrated embodiment, playback devices include personal computers 18, CE players 19, and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. The basic architecture of a playback device in accordance with an embodiment of the invention is illustrated in FIG. 2. The playback device 30 includes a processor 32 in communication with non-volatile memory 34 and volatile memory 36. The playback device 30 also includes a network interface 37 for communicating with external devices via a network connection. In the illustrated embodiment, the non-volatile memory includes a client application 38 that configures the processor and the playback device to perform multiphase adaptive bitrate streaming. The non-volatile memory 34 also includes cryptographic data 40 that can be utilized in accessing encrypted content. In addition, the playback device can include audio and/or video rendering capabilities and/or audio and video outputs (not shown). Although a specific playback device architecture is illustrated in FIG. 2, any of a variety of architectures including architectures where the client application is located on disk or some other form of storage and is loaded into volatile memory at runtime can be utilized to implement playback devices for use in multiphase adaptive bitrate streaming systems in accordance with embodiments of the invention. Furthermore, any of a variety of system architectures including (but not limited) to the system architecture illustrated in FIG. 1 can be utilized to perform multiphase adaptive bitrate streaming in accordance with embodiments of the invention.

Multiple Operational Phases

Figure 3:
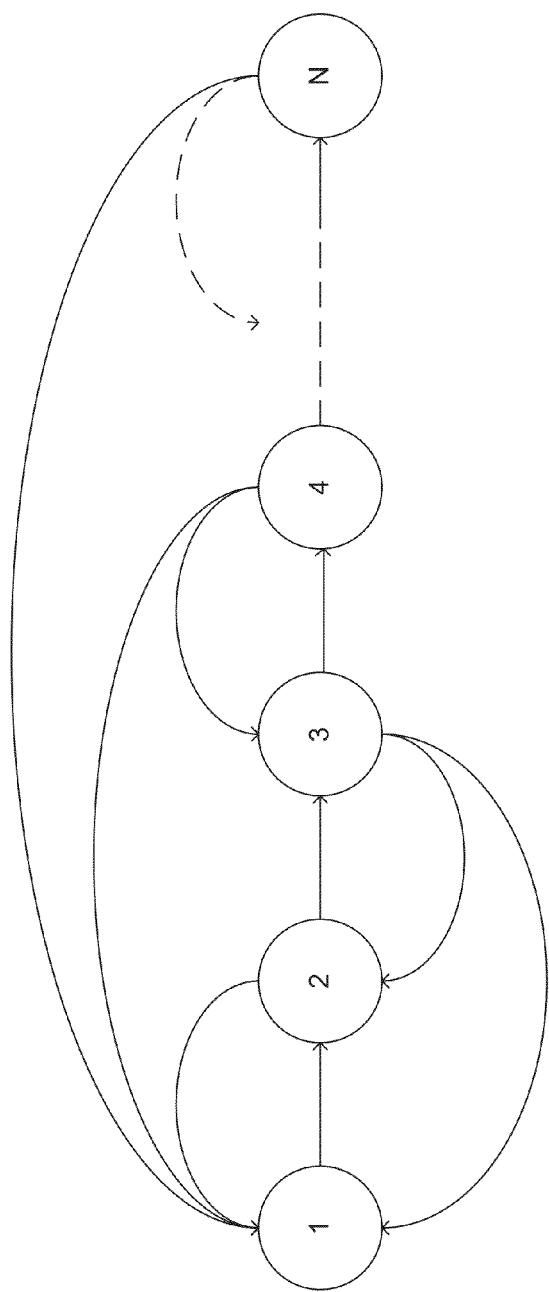
FIG. 3 conceptually illustrates multiple operational phases of a playback device configured to perform multiphase adaptive bitrate streaming in accordance with an embodiment of the invention.

Playback devices in accordance with embodiments of the invention can progress through a series of operational phases in which the playback device responds differently in each phase to changes in the streaming conditions. The operational phases of a playback device in accordance with an embodiment of the invention are conceptually illustrated in FIG. 3. At any time during the streaming of content, the playback device occupies a specific operational phase or state. In the illustrated embodiment, the playback device can occupy any of operational phases 1 through N. In each operational phase, the playback device can remain in the present operational phase, transition to a new phase or transition back to a previous phase. Typically, the playback device moves to a new operational phase or "increases" operational phase in response to an increase in the stability of the streaming conditions, and the playback device moves back to a previous operational phase or "decreases" operational phase in response to a decrease in the stability of the streaming conditions. Depending upon initial bandwidth measurements and the requirements of a specific application, the system may support starting at a higher phase and transitions involving skipping over phases. In the illustrated embodiment, the playback device progresses through each of the phases and can fall by a single phase, more than one phase or can fall back to the initial phase. As noted above, decisions concerning transitioning between operational phases are typically independent of decisions to switch between phases. Although in many embodiments, a decision to switch stream(s) to stream(s) having lower bandwidth requirements also results in a transition in operational phase. Although specific transitions are illustrated in FIG. 3, any of a variety of sets of transitions between operational phases can be defined as appropriate to the requirements of a specific application in accordance with embodiments of the invention. Furthermore, multiphase adaptive bitrate streaming systems in accordance with embodiments of the invention can utilize as few as two phases. Indeed, the combination of phases, the permitted transitions between phases and the conditions for transitioning between phases are only limited by the requirements of a specific application.

Multiphase Adaptive Bitrate Streaming

Figure 4:
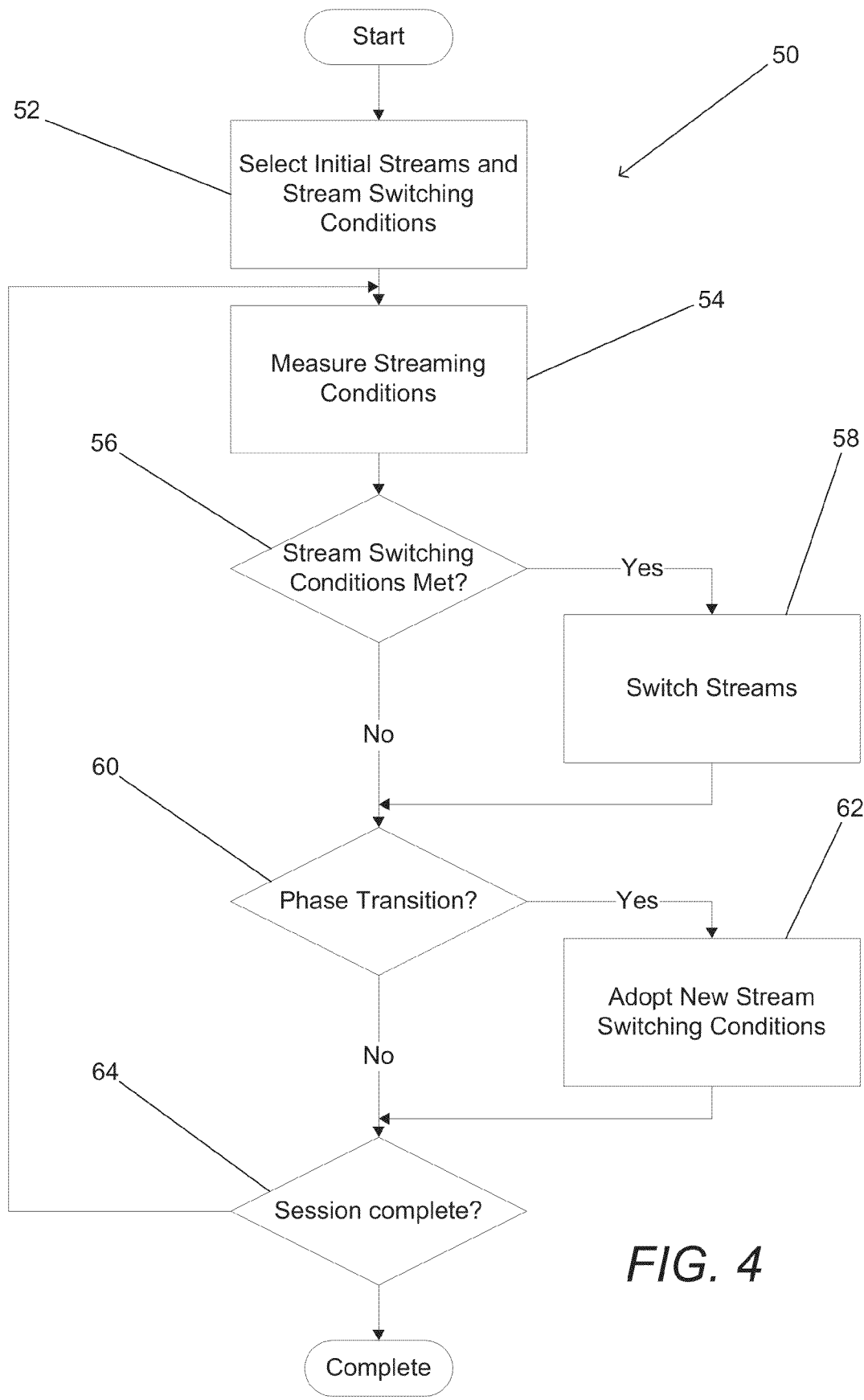
FIG. 4 is flow chart illustrating a process for performing multiphase adaptive bitrate streaming in accordance with an embodiment of the invention.

As discussed above, multiphase adaptive bitrate streaming can be performed utilizing any number of operational phases and criteria for transitioning between operational phases. A generalized process for playback of content in a multiphase adaptive bitrate streaming system in accordance with embodiments of the invention is illustrated in FIG. 4. The process 50 commences by selecting (52) initial streams and stream switching conditions. Instead of simply starting requesting the lowest bitrate stream(s), a playback device can perform an initial bandwidth probe to estimate the available bandwidth and select initial streams with which to commence streaming based upon the bandwidth estimate. Processes for selecting initial stream(s) are disclosed in U.S. patent application Ser. No. 13/251,061, entitled "Systems and Methods for Determining Available Bandwidth and Performing Initial Stream Selection When Commencing Streaming Using Hypertext Transfer Protocol" to Van Der Schaar et al., filed Sep. 30, 2011. The disclosure of U.S. patent application Ser. No. 13/251,061 is incorporated herein by reference in its entirety. The initial stream switching conditions that are selected can be selected by default (e.g. the system always commences in predetermined phase) or can be selected based upon the measurements utilized to select the initial streams (whether performed immediately prior to commencement of streaming or based upon historical measurements).

Once initial streams and stream switching conditions are selected, the process illustrated in FIG. 4 involves measuring (54) streaming conditions as content is received and played back by a playback device, and then determining (56) whether stream switching conditions are met. When the stream switching conditions are met (either to switch to streams having a higher combined maximum bitrate or to switch to streams that have a lower combined maximum bitrate), the playback device performs (58) the appropriate stream switch(es). The playback device also determines (60) whether the conditions are met for a transition between operational phases. In the event that the conditions are met, the playback device transitions between operational phases, which involves adopting (62) a different set of stream switching conditions. The playback device determines (64) whether the session is complete. If not, the process loops back to measuring (54) streaming conditions and performing stream switches and phase transitions as appropriate. When the session is complete, the process terminates.

Although a specific process for performing multiphase adaptive bitrate streaming is illustrated in FIG. 4, any of a variety of processes that involve the adoption of different sets of stream switching conditions based upon any of a variety of factors including (but not limited to) the measured streaming conditions can be utilized in accordance with embodiments of the invention.

Transitioning to a Less Responsive Phase

In several embodiments, the decision to transition from a phase in which the playback device reacts rapidly to changes in streaming conditions to a phase in which it reacts more slowly considers a variety of factors including (but not limited to) any combination of duration of playback of the content, time since last stream switch, duration within an operational phase, the amount of buffered content and/or the stability of the streaming conditions experienced during playback. In a number of embodiments, a transition is made when the bandwidth has been stable for a predetermined period of time. Stability may be defined in a number of ways; for example, it can be defined as the periodic sampling of the bandwidth at a specific interval (such as every 1 second), and the difference between the highest measured rate and lowest measured rates between several consecutive intervals (for example 10 seconds) to be within a certain range (such as 10%) of one another. Another measure of stability may be if streaming has continued using the same level for a predetermined interval (for example 15 seconds). In other embodiments, any of a variety of different stability measures can be utilized. In several embodiments, the playback device is only permitted to remain within an operational phase a predetermined period of time without transitioning to a less responsive operational phase. In many embodiments, when a playback device transitions to a less responsive phase after the maximum period of time in which the playback device is allowed to remain in the previous phase elapses, the playback device also selects stream(s) that will enable sufficient buffering of content to avoid stream switches in response to volatility on the streaming conditions as part of the transition. In another group of embodiments, the playback device will not transition until the playback device has occupied a particular operational phase for a predetermined period of time. In systems that include more than two phases, the predetermined period of time can be different depending upon the phase to which the playback device will transition. In a further set of embodiments, the playback device transitions to a phase in which the playback device reacts more slowly to changes in streaming conditions when a predetermined amount of content is buffered.

Transitioning to a More Responsive Phase

Generally, a transition from a phase in which the playback device reacts more slowly to changes in streaming conditions to a phase in which the playback device reacts more rapidly to changes in streaming conditions occurs in response to the playback device switching to stream(s) having a lower maximum bandwidth requirement. In multiphase adaptive bitrate streaming systems having more than two phases, the transition is typically a transition to the previous phase, or to the phase in which the playback device is most responsive to changes in streaming conditions (often referred to as the "lowest" phase). The buffering requirements typically increase with successively higher phases of operation; for example, in a two-phase system, the first phase may buffer a maximum of 10 seconds of audio, video, and metadata content, and the second phase may buffer as much content as allowable by the system memory. In a multi-phase system, the first phase may buffer a maximum of 10 seconds of audio, video, and metadata content, the next phase a maximum of 20 seconds of content and so forth, and the last phase buffering as much content as allowable by the system memory. It is possible to use a physical memory buffer limitation for each phase, rather than the maximum duration of the content. In other embodiments, any of a variety of buffering conditions and/or constraints can be imposed as appropriate to the requirements of a specific application. When a playback device transitions to a lower phase (i.e. a more responsive phase), the playback device can reduce the amount of buffered content below the maximum allowed in the lower phase by pausing the downloading of new content until the buffering levels for the lower phase have been met.

The stream switching conditions that can be applied by a playback device during different operational phases and the criteria for transitioning between the phases in accordance with embodiments of the invention are discussed further below with respect to a two phase adaptive bitrate streaming system.

A Two Phase Adaptive Bitrate Streaming System

Multiphase adaptive bitrate streaming systems in accordance with embodiments of the invention can support multiple operational phases in which playback devices respond differently in each phase to changes in the streaming conditions. A comparatively simple implementation of a multiphase adaptive bitrate streaming system is to utilize two operational phases. A first phase that utilizes stream switching conditions that cause the playback device to react very quickly to changes in the streaming conditions, and a second phase in which the stream switching conditions cause the playback device to buffer more content and react more slowly to changes in streaming conditions. For example, the system may behave differently for a temporary change in the available bandwidth due to the sharing of bandwidth with another activity (such as downloading of an MP3 music file in a home while utilizing adaptive streaming), where in the case of a phase which allows quick reactions, the streaming quality may degrade as soon as a drop in the bandwidth throughput is detected, but in a case which allows slower reaction, the streaming player may consume a certain amount of the buffered content first, prior to allowing a switch to a lower streaming level. In several embodiments, the playback device is configured to transition between the two phases based upon the stability of the streaming conditions.

Figure 5:
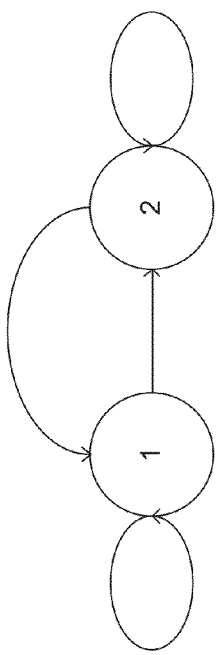
FIG. 5 conceptually illustrates the operational phases of a two phase adaptive bitrate streaming system in accordance with an embodiment of the invention.

Operational phases of a two phase adaptive bitrate streaming system in accordance with embodiments of the invention is illustrated in FIG. 5. The two illustrated operational phases correspond to a first operational phase (i.e. phase 1) in which a first set of stream switching conditions is utilized that cause the playback device to react very quickly to changes in the streaming conditions and a second operational phase (i.e. phase 2) in which a second set of stream switching conditions is utilized that cause the playback device to buffer more content and react more slowly to changes in streaming conditions. In each phase, the playback device can remain in the operational phase or transition to the other operational phase.

Figure 6:
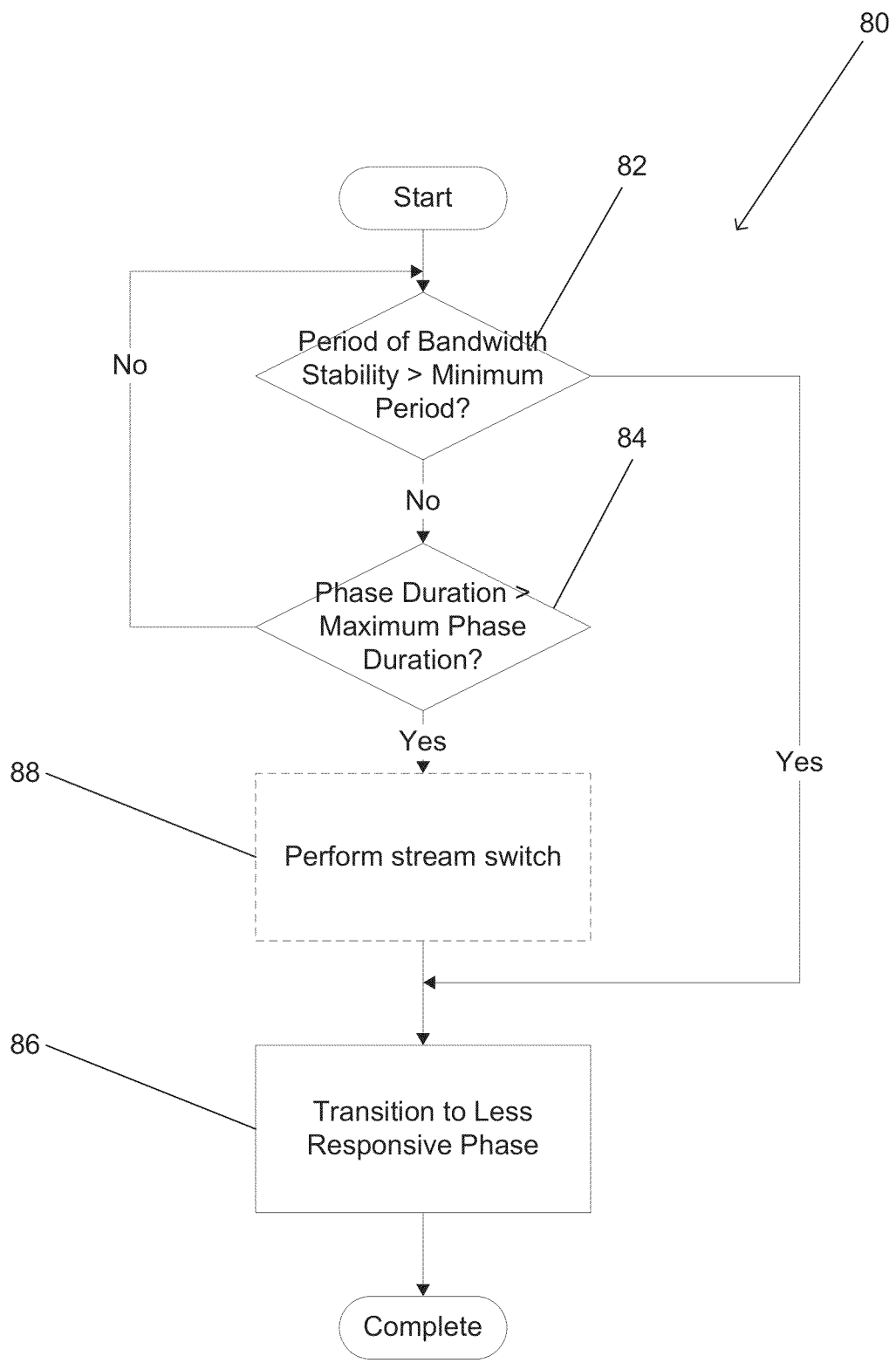
FIG. 6 is a flow chart illustrating a process for determining when to transition from an operational phase in which a playback device's stream switching decisions are more response to variations in streaming conditions to an operational phase in which the playback device's stream switching decisions are less responsive to variations in streaming conditions in accordance with an embodiment of the invention.

Any of a variety of criteria can be utilized when determining whether to perform a specific phase transition. In many embodiments, the decision to switch from a phase in which the playback device reacts rapidly to changes in streaming conditions (e.g. phase 1 in FIG. 5) to a phase in which the playback device reacts more slowly to changes in streaming conditions (e.g. phase 2 in FIG. 5) is performed based upon the stability of the streaming conditions and/or a variety of other factors. Indeed, in many embodiments an initial measurement of the available bandwidth may suggest that the system can start in a phase in which the playback device reacts more slowly to changes in streaming conditions (e.g. phase 2 in FIG. 5). A process for determining whether to transition from a phase in which the playback device reacts rapidly to changes in streaming conditions to a phase in which the playback device reacts more slowly to changes in streaming conditions is illustrated in FIG. 6. The process 80 involves determining (82) whether a minimum period of bandwidth stability has been observed or (84) whether the phase duration has exceeded a maximum permitted phase duration. If either condition is satisfied, then a transition (86) to a phase in which the playback device is less responsive to streaming conditions occurs. If neither condition is satisfied, then the process repeats until a phase transition occurs. In a number of embodiments, a phase transition that occurs as a result of the phase duration exceeding a maximum permitted phase duration also precipitates a stream switch (88) to stream(s) appropriate to the new phase given the observed volatility in streaming conditions. This may be achieved by selecting the average bandwidth that was observed during the initial phase, and switching to an appropriate level; alternatively, a percentage value of the latest N bandwidth samples measured within a certain period may be selected (such as 0.70 times the average of the last 5 bandwidth measurements, taken at regular intervals of 1 seconds each). In other embodiments, any of a variety of conditions can be utilized appropriate to a specific application. Although a specific process is illustrated in FIG. 6, any of a variety of processes can be utilized for determining when to transition from a phase in which the playback device reacts rapidly to changes in streaming conditions to a phase in which the playback device reacts more slowly to changes in streaming conditions as appropriate to the requirements of a specific application in accordance with embodiments of the invention.

Figure 7:
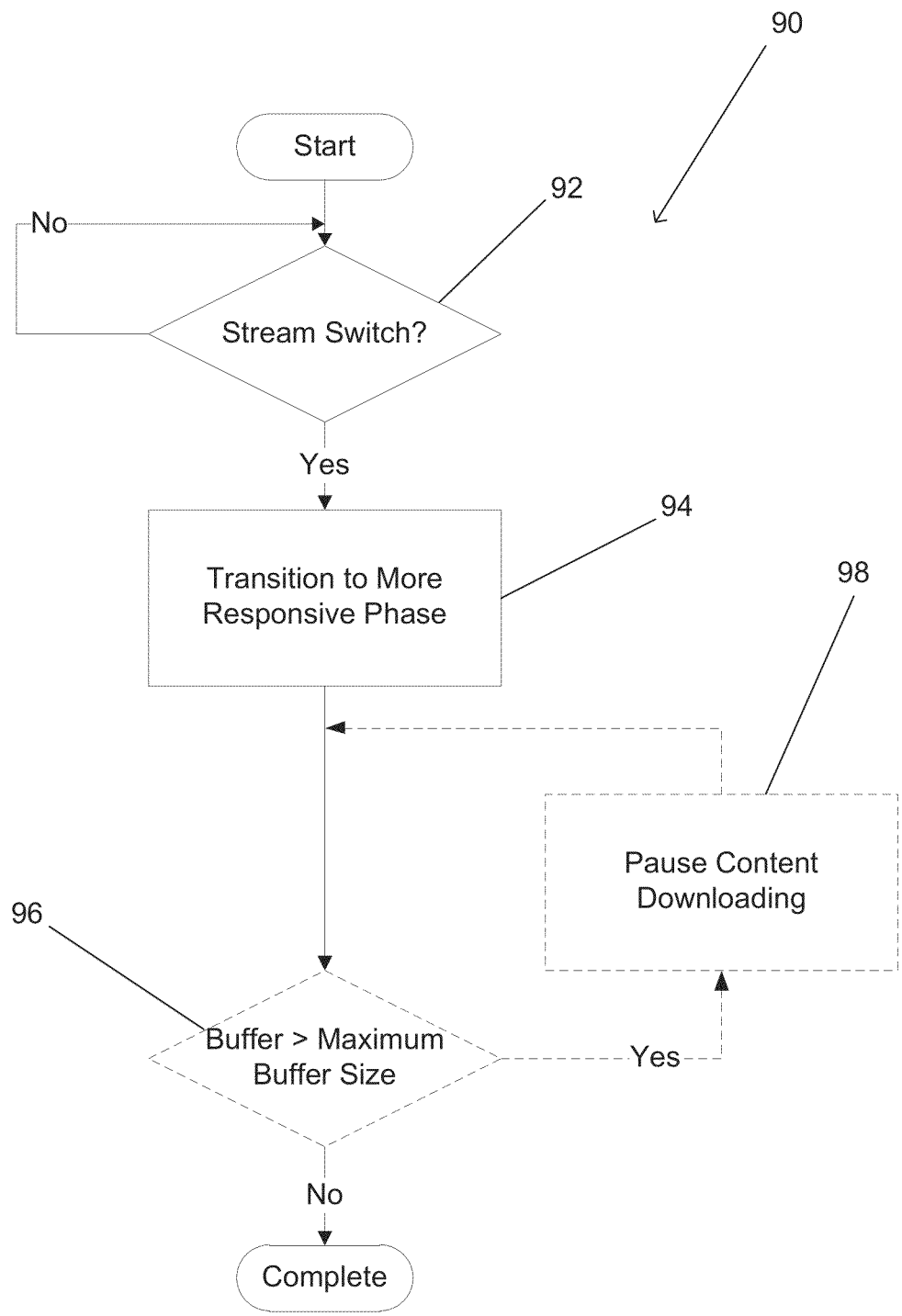
FIG. 7 is a flow chart illustrating a process for determining when to transition from an operational phase in which the playback device's stream switching decisions are less responsive to variations in streaming conditions to an operational phase in which a playback device's stream switching decisions are more response to variations in streaming conditions in accordance with an embodiment of the invention.

In a number of embodiments, the decision to switch from a phase in which the playback device reacts more slowly to changes in streaming conditions (e.g. phase 2 in FIG. 5) to a phase in which the playback device reacts rapidly to changes in streaming conditions (e.g. phase 1 in FIG. 5) is performed based upon the occurrence of a stream switch to a stream(s) having a lower maximum bandwidth requirement. A process for determining whether to transition from a phase in which the playback device reacts slowly to changes in streaming conditions to a phase in which it reacts more rapidly to changes in streaming conditions is illustrated in FIG. 7. The process 90 includes determining (92) whether a stream switch has occurred and when a stream switch has occurred, transitioning (94) to a phase in which the playback device is more responsive to changes in streaming conditions. In many embodiments, when the playback device transitions (94) to a more responsive phase, the playback device determines (96) whether the amount of buffered content exceeds the maximum amount of buffered content allowed in the new phase. In the event that the amount of buffered content exceeds the maximum amount of buffered content allowed in the new phase, the playback device can pause (98) downloading of content until the buffering requirements are met. Although a specific process is illustrated in FIG. 7, any of a variety of processes for determining whether to transition from a phase in which the playback device reacts slowly to changes in streaming conditions to a phase in which it reacts more rapidly to changes in streaming conditions can be utilized as appropriate to the requirements of a specific application in accordance with embodiments of the invention. Furthermore, although the processes shown in FIGS. 6 and 7 are discussed with reference to transitions between two phases, similar processes considering the same or similar criteria for determining whether to perform phase transitions can be utilized in multiphase adaptive bitrate streaming systems including three or more phases.

Although the present invention has been described in certain specific aspects, many additional modifications and variations would be apparent to those skilled in the art. It is therefore to be understood that the present invention may be practiced otherwise than specifically described, including utilizing playback devices that support a greater number or lesser number of operational phases and that transition between phases in ways different to the specific examples discussed above and/or playback devices where the set of streaming switching conditions utilized by the playback device are continuously changing, without departing from the scope and spirit of the present invention. Thus, embodiments of the present invention should be considered in all respects as illustrative and not restrictive.

What is claimed:

1. A playback device configured to perform multiphase adaptive bitrate streaming by requesting portions of encoded media from a plurality of alternative streams of encoded media that are encoded at different maximum bitrates in response to changes in streaming conditions, the playback device comprising:
 a processor configured, via a client application, to request portions of files from a remote server;
 wherein the client application further configures the processor to:
  commence streaming of the encoded media in a first operational phase utilizing a first set of stream switching conditions by requesting portions of the encoded media from one of the plurality of alternative streams encoded at a specified maximum bitrate;
  measure streaming conditions for receiving the requested portions of the encoded media from a current one of the plurality of alternate streams having a current maximum bitrate;
  determine when a first set of stream switching conditions is satisfied in a first operational phase by the measured streaming conditions;
  request portions of the encoded media from another one of the plurality of alternative streams encoded at a maximum bitrate that is different than the current maximum bitrate in response to the determination that the first set of stream switching conditions are satisfied;
  determine when at least one phase transition criterion of the first operational phase is satisfied by the measured streaming conditions;
  transition to a second operational phase utilizing a second set of stream switching conditions in response to the determination that the at least one transition criterion is satisfied;
  determine when the second set of stream switching conditions is satisfied in the second operational phase by the measured streaming conditions; and
  request portions of the encoded media from another one of the plurality of alternative streams encoded at a maximum bitrate that is different from the current maximum bitrate in response to the determination that the second set of stream switching conditions are satisfied.

2. The playback device of claim 1, wherein the first set of stream switching conditions configure the playback device to respond more rapidly to changes in streaming conditions than when the playback device is configured using the second set of stream switching conditions.

3. The playback device of claim 1, wherein the second set of stream switching conditions configure the playback device to buffer more content than when the playback device is configured using the first set of stream switching conditions.

4. The playback device of claim 1, wherein the client application configures the processor device to progress through a plurality of operational phases including the first and second operational phases, where a different set of stream switching conditions are utilized during each of the plurality of operational phases.

5. The playback device of claim 4, wherein in at least one of the plurality of operational phases the client application configures the playback device to transition to another one of the plurality of operational phases having a larger maximum buffer size when at least one phase transition criterion is satisfied.

6. The playback device of claim 4, wherein in at least one of the plurality of operational phases the client application configures the playback device to transition to another one of the plurality of operations phases that stores a larger amount of content measured in units of time when at least one phase transition criterion is satisfied.

7. The playback device of claim 4, wherein in at least one of the plurality of operational phases the client application configures the playback device to transition to another one of the plurality of operational phases having a smaller maximum buffer size when at least one phase transition criterion is satisfied.

8. The playback device of claim 4, wherein in at least one of the plurality of operational phases the client application configures the playback device to transition to another one of a plurality of operational phases storing a smaller amount of content measured in units of time when at least one phase transition criterion is satisfied.

9. The playback device of claim 1, wherein the client application configures the playback device to transition to the second operational phase in response to a determination that the streaming conditions are stable for a predetermined period of time.

10. The playback device of claim 9, wherein the client application determines streaming conditions are stable by observing a set of consecutive measurements and determining that the minimum and maximum observed rates fall within a predetermined range.

11. The playback device of claim 9, wherein the client application determines streaming conditions are stable by observing the same streaming level for a predetermined amount of time.

12. The playback device of claim 1, wherein the client application configures the playback device to transition to the second operational phase in response to a determination that the time in which the playback device is in the first operational phase has exceeded a predetermined maximum time.

13. The playback device of claim 12, wherein the client application configures the playback device to select streams from the plurality of alternative streams appropriate to the second operational phase when the playback device transitions to the second operational phase in response to the determination that the time in which the playback device is in the first operational phase has exceeded the predetermined maximum time.

14. The playback device of claim 1, wherein the client application further configures the processor to determine when at least one phase transition criteria of the second operational phase is satisfied by the measured streaming conditions and to transition from the second operational phase to the first operational phase in which the first set of stream switching conditions are utilized in response to the determination that the at least one phase transition criteria is satisfied.

15. The playback device of claim 1, wherein the client application configures the playback device to transition from the second operational phase to the first operational phase in response to a determination that the second set of stream switching conditions is satisfied such that a stream switch occurs involving the playback device requesting portions of encoded media from one of the plurality of alternative streams that is encoded with a maximum bitrate that is lower than the maximum bitrate of the current one of the plurality of alternative streams from which the playback device was requesting portions of the encoded media prior to the stream switch.

16. The playback device of claim 15, wherein the client application configures the processor to suspend requesting portions of encoded media from a stream following a stream switch until the amount of buffered media is less than a maximum buffer size that forms part of the first set of stream switching conditions.

17. The playback device of claim 15, wherein the client application configures the processor to suspend requesting portions of encoded media from a stream following a stream switch until the amount of buffered media measured in units of time is less than a maximum amount of time that forms part of the first set of stream switching conditions.

18. A method of performing multiphase adaptive bitrate streaming by requesting portions of encoded media from a plurality of alternative streams of encoded media that are encoded at different maximum bitrates in response to changes in streaming conditions, the method comprising:
commencing streaming of the encoded media in a first operational phase utilizing a first set of stream switching conditions by requesting portions of the encoded media from one of the plurality of alternative streams encoded at a specified maximum bit rate using a playback device;
measuring streaming conditions for receiving the requested portions of the encoded media from a current one of the plurality of alternative streams encoded at a current maximum bitrate using the playback device;
determining when the first set of stream switching conditions is satisfied in a first operational phase by the measured streaming conditions;
requesting portions of the encoded media from another one of the plurality of alternative streams encoded at a maximum bitrate that is different from the current maximum bitrate in response to a determination that the first set of streaming conditions is satisfied using the playback device;
determining when at least one phase transition criterion of the first operational phase is satisfied by the measured streaming conditions;
transitioning the playback device to a second operational phase utilizing a second set of stream switching conditions in response to a determination that the at least one phase transition criterion is satisfied;
determining when the second set of stream switching conditions is satisfied by the measured streaming conditions in the second operational phase;
requesting portions of the encoded media from another one of the plurality of alternative streams encoded at a maximum bitrate than is different from the current maximum bitrate using the playback device.

19. The method of claim 18, wherein the first set of stream switching conditions configure the playback device to respond more rapidly to changes in streaming conditions than when the playback device is configured using the second set of stream switching conditions.

20. The method of claim 18, wherein the second set of stream switching conditions configure the playback device to buffer more content than when the playback device is configured to buffer using the first set of stream switching conditions.

21. The method of claim 18, further comprising progressing the playback device through a plurality of operational phases including the first and second operational phases, where a different set of stream switching conditions are utilized during each of the plurality of operational phases.

22. The method of claim 21, further comprising transitioning the playback device to a second one of the plurality of operational phases having a larger maximum buffer size than a current one of the plurality of operation phases when at least one phase transition criterion of the current one of the plurality of operation phases is met.

23. The method of claim 21, further comprising transitioning the playback device to one of the plurality of operation phases storing a larger amount of content measured in units of time size than a current one of the plurality of operation phases when at least one phase transition criteria of the current one of the plurality of operation phases is satisfied.

24. The method of claim 21, further comprising transitioning the playback device to one of the plurality of operation phases having a smaller maximum buffer size than a current one of the plurality of operation phases when at least one phase transition criterion of the current one of the plurality of operation phases is met.

25. The method of claim 21, further comprising transitioning the playback device to one of the plurality of operation phases storing a smaller amount of content measured in units of time than a current one of the plurality of operation phases when at least one phase transition criterion of the current one of the plurality of operation phases is satisfied.

26. The method of claim 18, wherein the playback device transitions from the first operational phase to the second operational phase in response to stable streaming conditions for a predetermined period of time.

27. The method of claim 24, wherein the playback device transitions to a subsequent operational phase in response to a determination that streaming conditions are stable for a predetermined period of time.

28. The method of claim 18, wherein the playback device determines streaming conditions are stable by observing a set of consecutive measurements and determining that the minimum and maximum observed rates fall within a predetermined range.

29. The method of claim 18, wherein the playback device determines streaming conditions are stable by observing the same streaming level for a predetermined amount of time.

30. The method of claim 18, wherein the playback device transitions to the second operational phase in response to a determination that the time in which the playback device is in the first operational phase has exceeded a predetermined maximum time.

31. The method of claim 26, further comprising selecting streams from the plurality of alternative streams appropriate to the second operational phase using the playback device when the playback device transitions to the second operational phase in response to the determination that the time in which the playback device is in the first operational phase has exceeded a predetermined maximum time.

32. The method of claim 18, further comprising determining when at least one phase transition criterion of the second operational phase is satisfied by the measured streaming conditions, and transitioning the playback device to the first operational phase in which the first set of stream switching conditions are utilized in response to the determination.

33. The method of claim 18, further comprising transitioning the playback device from the second operational phase to the first operational phase in response to a determination that the second set of stream switching conditions is satisfied by the measured streaming conditions such that a stream switch occurs involving the playback device requesting portions of encoded media from a stream of the plurality of alternative streams having a maximum bitrate that is lower than the maximum bitrate of the second one of the plurality of streams from which the playback device was requesting portions of the encoded media prior to the stream switch.

34. The method of claim 33, further comprising suspending requests from the playback device for portions of encoded media from the stream following the stream switch until the amount of buffered media is less than a maximum buffer size that forms part of the first set of stream switching conditions.

35. The method of claim 33, further comprising suspending requests from the playback device for portions of encoded media from the stream following the stream switch until the amount of buffered media measured in units of time is less than a maximum amount of time that forms part of the first set of stream switching conditions.

36. The method of claim 18, further comprising determining when at least one phase transition criterion is satisfied, and transitioning the playback device to the previous operational phase in which the corresponding enumeration of the set of stream switching conditions are utilized in response to the determination.

37. The method of claim 18, further comprising transitioning the playback device from an operational phase greater than the first to the previous operational phase in response to the corresponding enumeration of the set of stream switching conditions being satisfied such that a stream switch occurs involving the playback device requesting portions of encoded media from a stream having a maximum bitrate that is lower than the maximum bitrate of the stream from which the playback device was requesting portions of the encoded media prior to the stream switch.

38. The method of claim 37, further comprising suspending requests from the playback device for portions of encoded media from the stream following the stream switch until the amount of buffered media is less than a maximum buffer size that forms part of the previous set of stream switching conditions.

39. The method of claim 37, further comprising suspending requests from the playback device for portions of encoded media from the stream following the stream switch until the amount of buffered media measured in units of time is less than a maximum amount of time that forms part of the previous set of stream switching conditions.

40. A non-transitory machine readable medium containing processor instructions, where execution of the instructions by a processor causes the processor to perform a process comprising:
   commencing streaming of the encoded media in a first operational phase utilizing a first set of stream switching conditions by requesting portions of the encoded media from a first one of the plurality of alternative streams encoded at a first maximum bitrate;
   measuring streaming conditions for receiving the requested portions of the encoded media from a current one of the plurality of alternative streams encoded at a current maximum bitrate;
   determining when the first set of stream switching conditions is satisfied in a first operational phase by the measured streaming conditions;
   requesting portions of the encoded media from another one of the plurality of alternative streams encoded at a maximum bitrate that is different from the current maximum bitrate in response to a determination that the first set of stream switching conditions is satisfied;
   determining when at least one phase transition criterion of the first operational phase is satisfied by the measured streaming conditions;
   transitioning to a second operational phase utilizing a second set of stream switching conditions with respect to the current one of the plurality of alternative streams in response to a determination that the at least one phase transition criterion is satisfied;
   determining when the second set of stream switching conditions is satisfied by the measured streaming conditions in the second operational phase; and
   requesting portions of the encoded media from another one of the plurality of alternative streams encoded at a maximum bit rate that is different from the current maximum bitrate in response to the determination that second set of streaming conditions is satisfied.

41. The non-transitory machine readable medium of claim 40, wherein the machine readable medium is non-volatile memory.

* * * * *